Oct. 17, 1972    J. C. HEURTLEY    3,698,893
METHODS OF ORGANIZED THERMOPLASTIC XEROGRAPHY AND
PHOTORECEPTOR STRUCTURE THEREFOR
Filed Sept. 18, 1970

INVENTOR.
John C. Heurtley

BY *Marn & Jangarathis*

ATTORNEYS

United States Patent Office 3,698,893
Patented Oct. 17, 1972

3,698,893
METHODS OF ORGANIZED THERMOPLASTIC XEROGRAPHY AND PHOTORECEPTOR STRUCTURE THEREFOR
John C. Heurtley, Webster, N.Y., assignor to Xerox Corporation, Stamford, Conn.
Filed Sept. 18, 1970, Ser. No. 73,317
Int. Cl. G03g 13/22; B41m 5/20
U.S. Cl. 96—1.1
27 Claims

ABSTRACT OF THE DISCLOSURE

The present invention is directed to organized thermoplastic xerography techniques and more particularly to photoreceptor structure and methods of forming such photoreceptor structure so that viewable frost deformation patterns which are everywhere periodic may be formed on the surface of a thermoplastic layer using such organized thermoplastic xerography techniques. According to an embodiment of the present invention, photoreceptor structure which includes at least a photoconductive layer and an over-coated thermoplastic layer is provided in a manner such that an interface is formed therebetween. A periodic profile including a recurring geometric configuration having at least two linear sides is established at the interface between such photoconductive and thermoplastic layers so that upon charging, selective exposure and development the thermoplastic layer is forced to deform in a regular periodic manner which is exposure related.

This invention relates to organized thermoplastic xerography and more particularly to novel electrostatic methods and apparatus for forming a viewable pattern.

In the early stages of thermoplastic recording technology, a thermoplastic medium in the form of a layer of thermoplastic material was selectively charged in a vacuum by a cathode ray tube and thereafter softened by the application of heat or solvents thereto so that such thermoplastic layer would deform in response to the charges deposited thereon. When the thermoplastic medium returned to its hardened or solid state, the deformations caused by the selective charging were permanently stored thereon but could be erased by a second application of heat or solvents thereto. As the thermoplastic layer thus used manifested substantial storage density and could be optically read out, thermoplastic recording technology appeared to offer a promising new mode of data recordation. However, although the techniques employed appeared to be promising in the area of data storage, such techniques required expensive and complex equipment for both writing and readout and were not capable of producing an image having continuous tone such as would be necessary for document reproduction or the like.

As thermoplastic recording techniques advanced, it was discovered that the selective application of charge to the thermoplastic layer could be accomplished without the use of a cathode ray tube to selectively deposit charge in a vacuum by the adoption of certain xerographic, electrostatic charge deposition techniques. For instance, it was found that if the thermoplastic layer was overcoated on a photoconductive layer, such as that used in xerographic processes, the selective charge deposition on the thermoplastic layer could be accomplished by uniformly charging such overcoated thermoplastic layer and thereafter exposing the photoconductive layer to a light and dark pattern representative of the charge deposition desired. This technique as well as other well known xerographic techniques by which a latent image was formed on the thermoplastic medium completely avoided the need for vacuum charging, the onerous system limitations caused thereby and the cathode ray tube charging apparatus previously required. The deformation patterns thereby obtained on the thermoplastic layer after the same was developed by heating or exposure to solvents or the vapors thereof were of a nature such that a ridge-like deformation would occur at areas of sharp difference in the charge density of the applied charge pattern whereby the overall response of the thermoplastic layer or the deformation pattern obtained was related to the differences in the charge density of adjacent areas rather than the absolute charge density of each portion of the thermoplastic layer. This type of deformation pattern has been denominated a "relief" image because each deformation formed on the thermoplastic layer results from viscous flow which takes place between areas of substantial charge density difference due to differential fluid pressure in the thermoplastic layer below the charges and the lateral component of the electric vector on the charges at the boundary between each of such areas. Relief images are characterized by ridge-like deformations which take place for the most part only at the edges of the charge area and hence although relief imaging systems are suited for the reproduction of high contrast objects such as line copy or the like, no continuous tone reproductions are obtainable therewith. Exemplary of thermoplastic recording systems which produce relief images are U.S. Pat. No. 3,113,179 to Glenn, Jr.; U.S. Patent No. 3,095,324 to Casano et al.; U.S. Pat. No. 3,063,872 to Baldebuck; U.S. Pat. No. 3,055,006 to Dreyfoos, Jr., et al. and U.S. Pat. No. 2,985,866 to Norton.

Additionally, it has been found that if the thickness of the layer of thermoplastic material overcoated on the photoconductive layer to thereby form the responsive portion of a photoreceptor for a thermoplastic recordation system is maintained within a certain range, the nature of the deformation pattern obtained will be markedly different from that associated with a relief image. This form of deformation pattern has been termed frost deformation because the surface folds or wrinkles obtained on the surface of the thermoplastic layer appear similar to a frosted piece of glass. Frost imaging is highly advantageous because the deformation patterns obtained therewith are not only suitable for the production of line copy images as are relief imaging systems, but in contradistinction thereto, frost images exhibit inherent solid area coverage, continuous tone response and may be viewed directly or displayed by simplified reflection or transmission optical systems. Therefore, frost imaging systems are uniquely suited for data recordation as well as copying functions generally relegated to xerographic or photographic reproduction apparatus; however, unlike these forms of reproduction apparatus, frost imaging systems do not require the application of a particle carrying developer thereto.

Frost imaging systems generally rely upon a photoreceptor which includes a photoconductive layer, which may take the form of a xerographic plate, having a thin layer or film of thermoplastic material overcoated thereon. The thickness of the thermoplastic layer is usually in the range of $1\mu$–$6\mu$ however, a range of $0.5\mu$–$40\mu$ is generally considered available. The typical processing steps applied to this photoreceptor generally involve a charging step, at least one exposure step, a second charging step and a development step wherein the thermoplastic layer or film is heated or exposed to solvents or their vapors and allowed to deform. The frost images formed thereby may then be viewed directly, due to the surface scattering of radiation exhibited thereby, or displayed by simple optical reflection or transmission techniques. The phenomena of frost deformation is considered to be related not only to the charge placed on the thin thermoplastic layer, as in the case of the relief image, but is also a function of the characteristics of the thin thermoplastic layer per se which exhibits hydrodynamic resonance. Exemplary frost imaging systems are considered in U.S. Pat. No. 3,196,011, to Gunther et al.; U.S. Pat. No. 3,196,008, to Mihajlov et al. and the article by R. W. Gundlach and C. J. Claus entitled "A Cyclic Xerographic Method Based on Frost Deformation," Phot. Sci. and Eng. 7, 1, pps. 14–19, 1963.

As frost deformation is highly dependent on the characteristics of the thin thermoplastic layer, as is to a limited extent relief deformation, thermoplastic recording systems have been plagued with the problem of the uniform initiation of the deformation of the surface of the thermoplastic layer and the distortion problems attendant thereto. If frost deformation is considered, this problem may be appreciated by the realization that upon the development of the thermoplastic layer of a photoreceptor which has been charged, exposed to a light and dark pattern and thereafter charged again, in accordance with conventional frost recording techniques; whenever an overlap between the spatial spectrum of the incident radiation crosses the resonance points of the thermoplastic layer, i.e., the points on the surface of the thermoplastic layer corresponding to the quasi resonance points, surface perturbations associated with frost deformation will initially occur and such surface perturbations will manifest a growth rate which substantially exceeds the growth rates of surface perturbations associated with portions of the surface of the thermoplastic layer which do not correspond to such quasi resonance points and would normally frost subsequent thereto. Thus, under these conditions, the portions of the surface of the thermoplastic layer which frost first and exhibit large growth rates will distort, due to their excessive growth rates, other surface portions of the thermoplastic layer and hence the subsequent frosting thereof will not occur in a random manner. Therefore, unless the spatial spectrum of the input radiation applied to the photoreceptor is limited so as not to cross the quasi resonance points of the thermoplastic layer, the input information would be distorted and hence, the frost deformation pattern formed would be noisy and not truly representative of the information sought to be stored.

One solution to the foregoing problem, as discussed in U.S. Pat. No. 3,436,216, issued on Apr. 1, 1969 to J. C. Urback, is to modulate the input information or input radiation applied to the photoreceptor during the exposure step in a manner such that the variation of the carrier relied upon for such modulation corresponds to the quasi resonant frequency of the thermosplastic layer. The modulation of the input exposure in accordance with this solution is accomplished by the application of the input radiation to the surface of the thermoplastic layer through a spatial grating such as a screen or grid having a sinusoidal transmission characteristic whose frequency corresponds to the quasi resonance frequency of the thermoplastic layer. This is done by selecting a screen or grid wherein the distance between the average exposure points thereon is related to the quasi resonant frequency of the thermoplastic layer. In this manner, the problem of uniform perturbation initiation is avoided because the surface of the thermoplastic layer is forced to deform in a regular sinusoidal manner, the local amplitude of which is exposure related. Another solution to the foregoing problem is set forth in U.S. application Ser. No. 73,406, filed on equal date herewith and assigned to the Xerox Corporation. This second solution to the problem of obtaining uniform perturbation initiation in thermoplastic recording systems involves organized thermoplastic xerography techniques and shall be discussed in detail below in conjunction with FIGS. 1A–1D. Here, however, it is sufficient to note that in the use of such organized thermoplastic xerography techniques, the exposure information is not modulated, no spatial grating is required and no noise due to unexposed, unmodulated portions of the photoreceptor will obtain. The present invention is directed to improvements in organized thermoplastic xerography techniques such as those described in U.S. application Ser. No. 73,406.

Therefore, it is an object of this invention to provide photoreceptor structure for use in organized thermoplastic xerography wherein a thermoplastic layer of said photoreceptor will deform in a regular periodic manner.

It is a further object of this invention to provide a method of forming a photoreceptor structure having a thermoplastic layer adapted to deform in a regular periodic manner upon the development thereof.

It is another object of this invention to provide photoreceptor structure adapted to deform in a regular periodic manner and upon such deformation to exhibit a preferred direction of refraction for radiation impingment thereon.

Other objects of the present invention will become apparent from the detailed description of several exemplary embodiments thereof which follow and the novel features of the present invention will be particularly pointed out in conjunction with the claims appended hereto.

In accordance with the teachings of the present invention, photoreceptor structure and methods of forming such photoreceptor structure are provided so that organized frost deformation patterns may be formed on a thermoplastic layer wherein said photoreceptor structure includes at least a photoconductive layer and an overcoated thermoplastic layer and is formed having a periodic profile including a recurring geometric configuration of at least two linear sides at an interface between said photoconductive and thermoplastic layers so that upon charging, selective exposure and development said thermoplastic layer is forced to deform in a regular periodic manner which is exposure related. The invention will be more clearly understood by reference to the following detailed description of several exemplary embodiments thereof in conjunction with the accompanying drawings in which:

Referring now to the drawings and more particularly to FIGS. 1A–1D thereof, there are shown exemplary organized thermoplastic xerography techniques such as those illustrated in U.S. application Ser. No. 73,406 wherein a generalized form of photoreceptor structure is utilized in an organized thermoplastic xerography process so that a viewable pattern may be formed thereon. The photoreceptor structure shown in FIGS. 1A–1D comprises a substrate 2, a periodic structure 4 formed on such substrate, a photoconductive layer 6 and a layer of thermoplastic material 8 overcoated on said photoconductive layer 6. The substrate 2 may take the form of any supporting medium such as metal, glass or plastic which is capable of supporting the remaining portions of the photoreceptor in a relatively rigid form regardless of whether the thermoplastic layer 8 is in a solid or liquid state. The substrate 2 may exhibit either dielectric or conductive electrical characteristics depending upon the form chosen for the periodic structure 4, it being understood that it is desirable to have a conductive medium in electrical contact with the lower surface of the photoconductive layer 6. Additionally, the physical properties of the substrate 2 should be such that said substrate 2 maintains the same relative rigidity when the thermoplastic layer 8 is heated, treated by solvents or solvent vapors while being sufficiently flexible at all times so as to enable the resulting photoreceptor structure to be used, when desired in the form of webs or tapes suitable for the application of winding and reeling techniques thereto.

The periodic structure 4 may take the form of an individual layer affixed to the uppermost surface portion of the substrate 2 or, alternatively, as will be obvious to those of ordinary skill in the art, may comprise a portion of substrate 2 in contact with the photoconductive layer 6. The periodic structure 4, as shown in FIGS. 1A–1D, comprises a layer of material whose thickness varies in a regular periodic manner so that the upper surface thereof is physically deformed in a desired manner according to a prescribed frequency $\omega_r$. The deformation pattern relied upon in the formation of the periodic structure 4 may take any convenient pattern having a repetition rate or frequency $\omega_r$ which approximates the quasi resonant frequency $\omega_R$ of the thermoplastic layer 8, to be discussed in detail below. The amplitude of the surface excursions of the periodic structure 4 should be sufficient so that the periodic profile thereof will replicate through the photoconductive layer 6 to thereby cause the regular physical deformation pattern associated therewith to manifest itself at the interface between the photoconductive layer 6 and the thermoplastic layer 8. The periodic structure 4 may be formed of the same material as the substrate 2, or may comprise another convenient material which occupies the same class of materials as those previously mentioned in conjunction with the description of the substrate 2. As it is desirable that a conductive material be disposed at the lower surface of the photoconductive layer 6, as aforesaid, if the material selected for the periodic structure 4 is not conductive, a thin conductive metal film (not shown) may be overcoated on the deformed surface of the periodic structure 4, in the well known manner. The regularly deformed surface of the periodic structure 4 is provided with any convenient periodic distribution whose periodicity approximates the quasi resonant frequency $\omega_R$ of the thermoplastic layer 8; for example, the physical profile of the periodic structure 4, as shown in FIGS. 1A–1D, has been illustrated as a simple sinusoid which approaches the optical carrier $$f(x) = O_E(x)[\tfrac{1}{2}(+\cos(\omega_R x))]$$

often employed in screened thermoplastic recording systems. The purpose of the periodic structure, as shall be seen below, is to establish a periodically varying physical profile at the interface between the photoconductive layer 6 and the thermoplastic layer 8 to thereby induce a uniform growth rate when a frost image is formed; therefore, although such periodically varying physical profile is here formed by the replication of the periodic structure 4 through the photoconductive layer 6, it will be appreciated that said periodically varying physical profile could be established directly at the interface between the photoconductive layer 6 and the thermoplastic layer 8 by the insertion of a light transmissive periodically varying structure thereat such as a lenticular film. The periodic structure 4, as shown in FIGS. 1A–1D, is physically interposed between the photoconductive layer 6 and the substrate 2 and may either exhibit the same radiation transmission qualities as the substrate 2 or may be transparent.

The photoconductive layer 6 may comprise any of the well known class of insulating materials which are rendered conductive upon the application of radiation thereto. For instance, the photoconductive layer 6 may comprise photoconductive insulating materials such as amorphous selenium, alloys of sulfur, arsenic or tellurium with selenium, selenium doped with materials, such as thallium, cadmium sulfide, cadmium selenide, etc., particulate photoconductive materials such as zinc sulfide, zinc cadmium sulfide, French process zinc oxide, phthalocyanine, cadmium sulfide, cadmium selenide, zinc silicate, cadmium sulfoselenide, linear quinacridones, etc. dispersed in an insulating inorganic film forming binder such as a glass or an insulating organic film forming binder such as an epoxy resin, a silicone resin, an alkyl resin, a styrene-butadiene resin, a wax or the like. Other typical photoconductive insulating materials include: blends, copolymers, terpolymers, etc. of photoconductors and non-photoconductive materials which are either copolymerizable or miscible together to form solid solutions and organic photoconductive materials of this type include, anthracene, polyvinylanthracene, anthraquinone, oxidiazole derivatives such a 2,5 - bis - (p - amino - phenyl)-1,3,4 - oxadiazole; 2 - phenylbenzoxazole; and charge transfer complexes made by complexing resins such as polyvinyl carbazole, phenolaldehydes, epoxies, phenoxies, polycarbonates, etc. with Lewis acids such as phthalic anhydride; 2,4,7 - trinitrofluorenone; metallic chlorides such as aluminum, zinc or ferric chloride; 4,4 - bis(dimethylamino) benzophenone; chloranil, picric acid; 1,3, 5 - trinitrobenzene; 1 - chloroanthraquinone; bromal; 4-nitrobenzaldehyde; 4 - nitrophenol; acetic anhydride; maleic anhydride; boron trichloride; maleic acid, cinnamic acid; benzoic acid, tartaric acid, malonic acid and mixtures thereof. The photoconductive layer 6 may be made either transparent or radiation absorbing in nature by the choice of the photoconductive insulating material selected. The photoconductive layer 6, like most photoconductive layers relied upon in conventional xerographic apparatus, should exhibit electrical characteristics such that it is highly insulating in the absence of input or activating radiation applied thereto while manifesting excellent vertical conductivity and low lateral conductivity upon the exposure thereof to activating radiation. However, as shall be seen below, low lateral conductivity is no longer a characteristic which is of paramount importance because the organized thermoplastic xerography techniques employed may be practiced in a manner to attenuate the critical role played by the lateral conductivity of the photoconductive layer 6 in the resolution of the frost image formed. The thickness of the photoconductive layer 6 should be appropriate for the formation and selective dissipation of charge patterns of the requisite magnitudes so that high resolution frost images may be formed. Additionally, the thickness of the photoconductive layer 6 must be suitable, in embodiments wherein a periodic structure 4 is disposed on the substrate 2 or is formed as a part thereof, so that the regularly deformed surface profile of such periodic structure 4 will replicate through the photoconductive layer 6 to form a periodically deformed physical profile at the interface between the thermoplastic layer 8 and the photoconductive layer 6.

The thermoplastic layer 8 may comprise any thermoplastic material overcoated on the surface of the photoconductive layer 6 having a thickness which is appropriate so that hydrodynamic resonance plays a key role in the frost deformation which takes place at the surface thereof. The thermoplastic layer 8 may be formed of any material which deforms in the frost mode in accordance with the charge pattern thereon upon the application of heat, solvents and/or solvent vapors thereto. Typical examples of suitable thermoplastic materials include those set forth in Table I below as follows:

TABLE I

| Trademark | Chemical type | Manufacturer |
|---|---|---|
| (1) Piccotex | Styrene | Pennsylvania Industrial Chemical Corp. |
| (2) Piccolyte | Terpene resin | Do. |
| (3) Staybelite 5 | Rosin ester | Hercules Powder Co. |
| (4) Staybelite 10 | ----do---- | Do. |
| (5) Piccoumaron | Coumarone | Pennsylvania Industrial Chemical Corp. |
| (6) Piccolastic D150 | Styrene | Do. |
| (7) Piccoflex 100A | Polyvinyl chloride | Do. |
| (8) Velsicol X-37 | Copolymer resin | Velsicol Chemical Corp. |
| (9) Neville R13 | Coumarone indene | Neville Chemical Co. |
| (10) Nevillac soft | Phenol modified coumarone indene. | Do. |
| (11) Piccolastic E125 | Styrene | Pennsylvania Industrial Chemical Corp. |
| (12) Piccolastic D125 | ----do---- | Do. |
| (13) Picco 75 | Indene | Do. |
| (14) Piccopale 70 | Hydrocarbon (unsaturated). | Do. |
| (15) Piccolastic A-50 | Styrene | Do. |
| (16) Piccolastic A-75 | ----do---- | Do. |

However, such thermoplastic materials as are set forth in Table I, should be considered as exemplary only, rather than limiting, because the type of material chosen forms no part of the illustrated organized thermoplastic xerography techniques per se and hence, alternative materials may be readily substituted. The thickness of the thermoplastic layer 8 may vary over a wide range so long as the overcoated material deforms in the frost mode and hydrodynamic resonance plays a key role in such deformation. As a preferred range, the thickness of thermoplastic layer 8 may reside between $1\mu$ and $6\mu$; however, a range from $0.5\mu$–$40\mu$ is considered to be available. The thermoplastic layer 8 may be overcoated on the surface of the photoconductive layer 6 by any suitable deposition technique conventionally employed by those of ordinary skill in the art. For instance, convenient coating techniques which may be readily employed for overcoating the thermoplastic layer 8 onto the photoconductive layer 6 are set forth in Canadian Pats. 568,707 and 611,852 to Neugebauer et al.

The upper surface of the thermoplastic layer 8, as shown in FIGS. 1A–1D, does not initially exhibit the periodic profile established at the interface of such thermoplastic layer 8 with the photoconductive layer 6 because the surface tension present at the upper surface of such thermoplastic layer 8 will generally cause this surface to be smooth; however, as shall be seen below, the periodic profile present at the interface between the thermoplastic layer 8 and the photoconductive layer 6 will predispose the thermoplastic layer 8 to develop in a regular periodic or organized manner when the same is subsequently charged and developed. Thus, it is seen that the photoreceptor structure shown in FIGS. 1A–1D comprises a substrate 2, a photoconductive layer 6 and a thermoplastic layer 8 overcoated thereon, said photoreceptor being formed in a manner such that a periodic profile is established at the interface between such photoconductive layer 6 and said thermoplastic layer 8.

The photoreceptor structure described above may have a viewable frost pattern formed thereon by the exemplary organized thermoplastic xerography technique represented in FIGS. 1A–1D; however, as will be obvious to those of ordinary skill in the art, the organized thermoplastic xerography technique illustrated in FIGS. 1A–1D is only one of several possible modes of operation available. The descriptive terminology "organized thermoplastic xerography" has been utilized because, as shall be appreciated by those of ordinary skill in the art from the mode of operation set forth below, the photoreceptor structure employed is structurally predisposed so that upon the charging and development thereof the thermoplastic layer 8 will deform in a regular periodic or organized manner so that the resulting periodicity of the frost deformation pattern may be considered to be a product of the biased nature of the photoreceptor rather than a function of the intensity modulation of input radiation applied thereto as is the case in conventional screened frost modes of operation. Accordingly, it should be appreciated at the outset, that due to the prebiased nature of the photoreceptor structure relied upon, the organized thermoplastic xerography techniques described do not require the input or activating radiation applied to the photoreceptor structure to be applied through a screen or grid so that such input radiation is intensity modulated prior to receipt by such photoreceptor structure. Briefly, the organized thermoplastic xerography technique illustrated in FIGS. 1A–1D contemplates the steps of initially charging the upper surface of the photoreceptor structure to a uniform potential so that such charge is distributed on the surface of the thermoplastic layer 8, selectively exposing said photoreceptor structure to a light and dark pattern so that the photoconductive layer 6 is selectively rendered conductive whereupon selective charge dissipation occurs, optionally recharging the surface of said photoreceptor structure to a constant potential and developing such photoreceptor structure by the application of heat, solvents or solvent vapors thereto whereby an organized frost deformation pattern is established at the upper thermoplastic surface of the photoreceptor structure which corresponds to the light and dark pattern through which selective exposure took place. Furthermore, the development of said photoreceptor structure may be optionally accomplished in light to reduce the effects of any lateral conductivity exhibited by the photoconductive layer 6 and alleviate any infrared radiation difficulties related to heating the surface thereof in a dark environment.

Figure 1A:
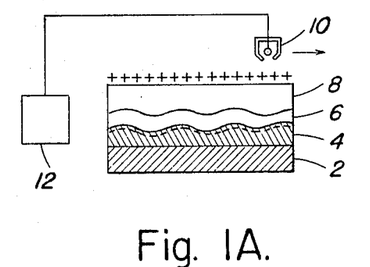
FIGS. 1A–1D illustrate exemplary organized thermoplastic xerography techniques wherein a generalized form of photoreceptor structure is utilized in an organized thermoplastic xerography process and a viewable pattern is formed thereon.

The initial step of the exemplary organized thermoplastic xerography technique illustrated in FIGS. 1A–1D is shown in FIG. 1A, wherein a charge is applied to the photoreceptor structure previously described above. For the purposes of explanation, the substrate 2 and the periodic structure 4 may be considered to comprise conductive materials which are referenced to ground potential or alternatively, the substrate 2 and the periodic structure 4 may be considered to be non-conductive in which case a thin grounded metallic conductive layer (not shown) may be present at the interface between the periodic structure 4 and the photoconductive layer 6. However, as the lower surface of the photoconductive layer 6 need not of necessity be referenced to ground, this being merely a preferred mode of operation, charge indications complementary to those applied to the surface of the photoreceptor structure have been illustrated in appropriate association with the photoconductive layer 6 so that a non-grounded mode of operation is also generally shown and it will be clearly understood by those of ordinary skill in the art that such charge indications may be considered as the ground plane charge levels for the grounded case. As shown in FIG. 1A, a charge as indicated by positive charge indications, is applied to the upper surface of the photoreceptor structure. This charge may be either positive, as indicated in FIG. 1A, or negative and may be applied in any manner well known to those of ordinary skill in the art. The technique for charging the upper surface of the thermoplastic layer 8 to a uniform potential illustrated in FIG. 1A may be considered to be a corona charging technique such as that described in U.S. Pats. 2,836,725 and 2,777,957 to Vyverberg and Walkup, respectively, wherein a specialized electrode means 10 is supplied by a source of high potential 12 and is capable of charging the upper surface of the thermoplastic layer 8 to a uniform potential when said specialized electrode means 10 is passed over such surface one or more times. The corona charging techniques set forth in the Vyverberg and Walkup patents are highly convenient for applying a charge to the upper surface of the thermoplastic layer 8 because a charge level which is substantial in magnitude and is either positive or negative in polarity may be quickly and easily established. However, although specific corona charging techniques have here been mentioned as suitable for charging the upper surface of the thermoplastic layer 8 to a constant potential, it should be noted that other charging techniques such as those employing radioactive sources or other corona charging techniques may be relied upon as the precise manner in which the charge level is established on the surface of the photoreceptor structure forms no part of the organized thermoplastic xerography techniques being illustrated. As the charge indicated by the positive signs + in FIG. 1A are applied to the surface of the thermoplastic layer 8, the photoreceptor structure will have complementary, opposite polarity charges induced therein at the interface between the photoconductive layer 6 and the conductive material, i.e. the metal conductor or the periodic structure 4, in the well known manner. Since the photoconductive layer 6 is, under the conditions specified heretofore, in its insulating state, the opposite polarity charges thereby induced at the underside of the photoconductive layer 6 will not be further conveyed toward the thermoplastic layer 8 and accordingly, the charge pattern associated with the photoreceptor structure will manifest a uniform potential and may be considered to approach that illustrated in FIG. 1A by the positive (+) and negative (−) signs therein.

Figure 1B:
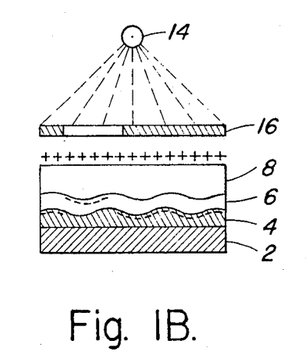

Upon the completion of the initial charging operation wherein the charge pattern shown in FIG. 1A is formed, the second step of the instant organized thermoplastic xerography technique may take place in the manner described in conjunction with FIG. 1B. The second step of the exemplary organized thermoplastic xerography technique illustrated in FIGS. 1A–1D comprises the selective exposure of the depicted photoreceptor structure to image radiation so that the photoconductive layer 6 is rendered selectively conductive in much the same manner as is traditionally done in conventional xerographic processes. This may be accomplished, as indicated in FIG. 1B by imaging radiation from a source 14 onto the upper surface of the thermoplastic layer 8, through a light and dark pattern 16 representing the object to be reproduced. As the thermoplastic layer 8 is transmissive to radiation impingent thereon, activating radiation which is selectively passed by the light and dark pattern 16 will propagate through the thermoplastic layer 8 and be received at discrete portions of the photoconductive layer 6 which spatially correspond to the light portions of such light and dark pattern 16. Therefore, in the well known manner, such corresponding portions of the photoconductive layer 6 will be selectively rendered conductive by the activating radiation received thereby so that the charge pattern residing at the interface between the photoconductive layer 6 and the conductive material will be altered in the manner shown in FIG. 1B wherein the charges residing at such discrete, activated portions of the photoconductive layer 6 will propagate therethrough to the lower surface of the thermoplastic layer 8 which is insulating in nature. The charge pattern on the surface of the thermoplastic layer 8 is thereby selectively dissipated to the extent that the surface of the photoreceptor structure no longer exhibits the same potential at the surface portions thereof overlying the activated portions of the photoconductive layer 6 as it does at the portions thereof which do not overlie the discrete portions of the photoconductive layer which have been activated. Thus, in the second step of the organized thermoplastic xerographic technique according to the present invention, the charge pattern illustrated in FIG. 1B is established due to the selective exposure of the photoreceptor structure to activating radiation from the source 14. The source 14 may comprise any suitable form of radiation imaging means capable of generating radiation whose wavelength is appropriate for activating the photoconductive layer 6 and which may be selectively imaged through the light and dark pattern 16. Thus, assuming the availability of materials having the requisite characteristics for the formation of a suitable light and dark pattern 16 and an appropriate photoconductive layer 6, the source 14 may generate radiation having any selected range of wavelengths in the spectrum from infrared to X-rays. Practically, the source 14 may generate any actinic group of wavelengths or a source of X-rays may alternatively be used. The light and dark pattern 16 illustrated in FIG. 1B has been depicted as comprising a solid member having a singular light transmissive portion therein so that the mode of selective exposure of the photoconductive layer 6 and the resulting charge pattern formation attending such exposure may be simply illustrated and explained. However, as will be obvious to those of ordinary skill in the art, the light and dark pattern 16 shown in FIG. 1B may practically comprise any form of data records presently capable of reproduction by xerographic or photographic techniques. For instance, the light and dark pattern 16 may comprise a photographically formed negative or positive transparency or any other form of data record capable of selective radiation transmission. Alternatively, the light and dark pattern 16 may comprise an opaque surface having data indicia present thereon; however, when these conditions obtain, as will be obvious to those of ordinary skill in the art, the source of radiation 14 will be repositioned so that the photoreceptor structure depicted in FIG. 1B is selectively exposed using conventional radiation reflection techniques rather than the transmission techniques employed in conjunction with FIG. 1B. Thus it is seen that according to the second step of the organized thermoplastic technique depicted in FIG. 1B, the charge pattern established in the photoreceptor structure is selectively altered so that the potential present at the surface thereof is no longer uniform. Additionally, although the steps of the organized thermoplastic xerographic technique described in conjunction with FIGS. 1A and 1B have been set forth in a sequential mode of operation, it will be appreciated by those of ordinary skill in the art that such steps may be combined so as to be performed simultaneously.

Figure 1C:
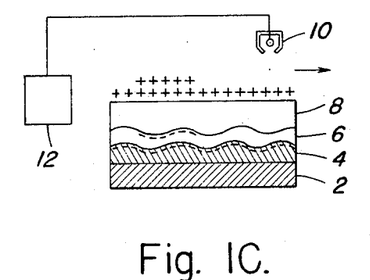

The third step of the exemplary organized xerography technique illustrated in FIGS. 1A–1D comprises, as shown in FIG. 1C, a second charging step wherein the surface of the photoreceptor structure is again charged to a constant potential with respect to ground, or the reference potential associated with the conductive material in contact with the lower surface of photoconductive layer 6. This may be accomplished in the same manner as was described in conjunction with FIG. 1A wherein the specialized electrode 10 of a corona charging device is passed over the surface of the photoreceptor structure so that a charge is again applied thereto in a manner which tends to bring the surface to a uniform potential whose value is determined by the voltage of the specialized electrode 10. As the portions of the thermoplastic layers which overlie the portions of the photoconductive layer 6 which did not receive activating radiation in the selective exposure step depicted in FIG. 1B remain at the same potential as was present after the initial charging operation depicted in FIG. 1A, these portions will not receive additional charge as the charge level thereat is already sufficient to manifest the potential which the second charging operation seeks to impose. Thus, in FIG. 1C, the portions of the overcoated thermoplastic layer 8 which overlie portions of the photoconductive layer 6 which did not receive activating radiation have been depicted with the same number of charge representing indicia as were utilized for such portions in FIGS. 1A and 1B. In contradistinction thereto, the portions of the thermoplastic layer 8 overlying the portions of the photoconductive layer 1 which have received activating radiation have had the potential level associated therewith reduced by the selective exposure step depicted in FIG. 1B. Accordingly, such portions of the overcoated thermoplastic layer 8 which overlie portions of the photoconductive layer 6 which were rendered conductive during the selective exposure step illustrated in FIG. 1B will receive additional charge during the recharging step illustrated in FIG. 1C so that the potential level associated therewith becomes equal to that associated with the remainder of the upper surface of the thermoplastic layer 8. This condition is illustrated in FIG. 1C by the second, partial row of charge representing indicia associated with the portions of the thermoplastic layer 8 overlying the portions of the photoconductive layer 6 which received activating radiation during the selective exposure step illustrated in FIG. 1B. Therefore, as may be appreciated from an inspection of FIG. 1C, the second charging operation acts to establish each portion of the surface of the thermoplastic layer 8 at the same potential with respect to ground or another reference potential associated therewith. However, although the surface of the thermoplastic layer 8 has been rendered an equipotential surface with respect to ground by the second charging operation depicted in FIG. 1C, it will be apparent that the surface charge density of the photoreceptor structure now varies in proportion to its capacitance with respect to ground or the reference potential associated with the conductive material in contact with the lower surface of the photoconductive layer 6 and such capacitance has been substantially increased in the portions of the photoreceptor structure vertically associated with the portions of the photoconductive layer 6 which were selectively exposed to activating radiation. Thus, at the termination of the third step of the organized thermoplastic xerography technique shown in FIGS. 1A–1D, the charge density present at the surface of the thermoplastic layer 8 varies in accordance with the light and dark pattern 16 through which the photoreceptor structure was selectively exposed.

As thermoplastic layer 8 is sufficiently thin so that hydrodynamic resonance plays a key role in the deformation thereof when such surface is developed by the application of heat, solvents or solvent vapors thereto; a thermoplastic layer 8 having a charge pattern present thereon such as that shown in FIG. 1C will deform in the frost mode such that very minute scattered depressions will be formed over the entire surface thereof, in accordance with the density of the charge pattern thereon, whereby the surface will take on the appearance of a piece of frosted glass. Where the charge density of the charge pattern present on the surface is substantial, i.e., those areas overlying selectively exposed portions of the photoconductive layer 6, the frost density will be substantial while those portions of the surface of the thermoplastic layer 8 where the charge density is less, due to their association with the unexposed portions of the photoconductive layer 6 will frost to a substantially lesser degree. In the absence of the instant organized frost techniques employed or the screened frost techniques relied upon by the prior art, upon the development of such a thermoplastic layer, the frost deformation pattern would generally develop in a manner which would appear random in character except that frost deformations will not be uniformly initiated and the surface perturbations associated therewith would not exhibit uniform growth rates. These characteristics of frost in a random mode of operation are probably attributable to the characteristics of hydrodynamic resonance which takes place in the thin thermoplastic layer and are responsible for the frost mode of operation. At any rate, it has been found that wherever the spectrum of the input radiation applied to selectively expose the photoconductive layer of the photoreceptor structure crosses a quasi resonance point of the thermoplastic layer, frost deformations will be immediately initiated upon the development thereof, while other portions of the thermoplastic layer will frost subsequently. Furthermore, the frost deformations initiated at such quasi resonance points will exhibit growth rates which are substantially in excess of those which take place at other portions of the surface of the thermoplastic layer. Thus, if the spectrum of the input radiation applied to the thermoplastic layer crosses the quasi resonant frequency thereof and frost deformations are allowed to occur in the random mode, the non-uniform initiation of frost together with the non-uniform growth rates attending the formation of the initial surface perturbations will result in the distortion of the portions of the thermoplastic layer which deform subsequently and hence the distortion of the overall frost image formed. In an effort to achieve uniform frost deformation initiation to thereby achieve an undistorted frost image of the light and dark pattern through which selective exposure takes place; it has been conventional to design the thermoplastic layer to have a high resonant frequency $\omega_R$ and to selectively expose the photoreceptor structure upon which the thermoplastic layer resides to activating radiation through a grid or screen whose filament spacing is related to the quasi resonant frequency of the thermoplastic layer. The former design technique constitutes an effort to design a thermoplastic layer whose quasi resonant frequency is sufficiently high so that activating radiation may be selected whose spectrum resides below the quasi resonant frequency $\omega_R$ of the thermoplastic layer whereupon non-uniform frost initiation at the quasi resonant frequency $\omega_R$ of the thermoplastic layer may be avoided. This design technique has not proven highly successful because the quasi resonant frequency $\omega_R$ of the thermoplastic layer is directly related to the thickness of such layer in a manner such that the thinner the thermoplastic layer, the higher the quasi resonant frequency $\omega_R$ exhibited thereby. However, as there is a lower limit of thickness beyond which viewable frost deformations will not occur and there are substantial manufacturing difficulties associated with the production of extremely thin thermoplastic layers, the use of thermoplastic films having a high quasi resonant frequency is insufficient, by itself, to solve the problems associated with non-uniform frost initiation. The latter design technique, wherein selective exposure takes place through a screen or grid whose filament spacings are related to the quasi resonant frequency $\omega_R$ of the thermoplastic layer, avoids the problem of non-uniform deformation initiation because the activating radiation applied thereto is sinusoidally modulated so that the surface of the thermoplastic layer is forced to deform in a regular sinusoidal manner, the local amplitude of which is exposure related. With organized thermoplastic xerography techniques, as shall be seen in conjunction with FIG. 1D, the surface of the thermoplastic layer 8 is also forced to deform in a regular periodic manner; however the periodic deformation does not derive from a screening or modulation of the selectively applied input radiation applied thereto but rather from the predisposition of the photoreceptor structure to deform in a regular periodic manner which is a function of the periodicity of the physical deformation at the interface between the photoconductive layer 6 and the thermoplastic layer 8 in the photoreceptor structure.

Figure 1D:
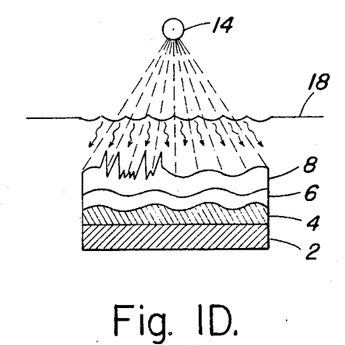

Returning now to the discussion of the FIGS. 1A–1D and more particularly to FIG. 1D thereof, the last step of the exemplary organized thermoplastic technique will be described. As shown in FIG. 1D, the last step of the organized thermoplastic process includes the development of the photoreceptor structure while the surface of the thermoplastic layer 8 is uniformly exposed to radiation as well as heat, solvents or solvent vapors which function to reduce such surface to a liquidous state. The development of the photoreceptor structure while uniformly exposing it to activating radiation from source 14 is optional but preferred because such uniform exposure serves to render the entire photoconductive layer 6 conductive so that the lower surface of the thermoplastic layer 8 is referenced to ground or the reference potential of the conductor in contact with the lower surface of the photoconductive layer 6 whereby any adverse effects to image formation at this stage of the organized thermoplastic xerography technique, due to the lateral conductivity exhibited by such photoconductive layer 6, are substantially avoided. The development in the presence of an ambient activating radiation level is also advantageous because, as will be apparent to those of ordinary skill in the art, the practical problems which attend a development step which must be carried out in a dark environment are completely avoided as are problems encountered with developing with heat and the infrared radiation emission problems which may be associated therewith. The source 14 of radiation relied upon to carry out the uniform exposure associated with FIG. 1D may comprise the same means described in conjunction with FIG. 1B.

The actual development is carried out by the developer means 18 illustrated in FIG. 1D. The developer means 18 may comprise any conventional means which is appropriate for applying the requisite energy or fluid to the surface of thermoplastic layer 8. Although the precise form of the developer means 18 will be a function of the type of thermoplastic layer 8 relied upon and the preference of the designer thereof as to whether heat, solvents, or solvent vapors are to be utilized to lower the viscosity of the thermoplastic layer 8, it will be apparent to those of ordinary skill in the art that the developer means 18 may comprise any means capable of lowering the viscosity of the thermoplastic layer to a liquid state whereat such thermoplastic layer 8 may deform in the frost mode in accordance with the charge pattern present thereon. When the desired frost density is obtained, the thermoplastic layer 8 may be allowed to harden normally or the viscosity of the thermoplastic layer 8 may be quickly raised to rapidly stop the frost mechanism. The frost image, as formed in a manner to be subsequently described, will then represent a permanent visible image of the data indicia present on the light and dark pattern 16 which may be retained for subsequent use and/or thereafter erased, in the well known manner, by a second application of heat, solvents, or solvent vapors thereto.

The frost mechanism which operates upon the development of the photoreceptor structure shown in FIG. 1D may be considered to be a combination of the frost mechanism which ordinarily operates in a frostable surface due to the charge pattern present thereon and the frost mechanism which operates in association with the periodic physical deformation present at the interface between the thermoplastic layer 8 and the photoconductive layer 6. The frost mechanism which operates in association with the periodic physical deformation present at the interface between the thermoplastic layer 8 and the photoconductive layer 6 predisposes, as aforesaid, the surface of the thermoplastic layer 8 to frost upon a lowering of the viscosity thereof in a manner such that periodic perturbations of the surface will occur in the nature of frost at substantially the frequency of the periodic physical deformation. Furthermore, if the periodic physical deformation present at the interface between the thermoplastic layer 8 and the photoconductive layer 6 closely approaches the quasi resonant frequency $\omega_R$ of the thermoplastic layer 8 present at such interface, such periodic surface perturbations will form at the greatest possible speed to insure that development is rapidly accomplished. Thus, the predisposition of the thermoplastic layer 8 will force the surface thereof to frost in a periodic or organized manner wherein the periodicity of such organized frost, as shown in FIG. 1D, is directly related to the frequency of the periodic physical deformation present at the interface between the thermoplastic layer 8 and the photoconductive layer 6. The reason for the phenomenon whereby the frost deformation which takes place at the surface of the thermoplastic layer 8 may be organized to correspond to the periodicity of the physical deformation present at the interface between the thermoplastic layer 8 and the photoconductive layer 6 is considered to admit of two possible explanations and is thought most probably to result from the combination of each. The first such possible explanation therefor may be denominated the electrostatic rationale and states that as the thermoplastic layer 8 in the low viscosity state represents substantially a uniform dielectric whose thickness is measured from the surface thereof upon which the charges reside to the interface between the thermoplastic layer 8 and the photoconductive layer 6, equal charges placed on one surface thereof will cause that surface to deform, when in a low viscosity state, in an equivalent manner across the entire surface with respect to the thickness of the dielectric. Therefore, if it is assumed that a uniform charge pattern is present on the surface of the thermoplastic layer 8, such surface will deform as a function of the dielectric thickness and follow the distribution of the periodic physical deformation present at the interface between the photoconductive layer 6 and the thermoplastic layer 8. Thus, any charge pattern present on the surface of the thermoplastic layer 8, such as that shown in FIG. 1C, may be analyzed in terms of a uniform charge component across the entire surface as well as additional charge components present at select portions of such surface and it will be readily appreciated by those of ordinary skill in the art that such uniform charge component will cause the surface of the thermoplastic layer 8, upon the development thereof, to frost in a periodic manner which follows the periodic physical deformation present at the interface between the thermoplastic layer 8 and the photoconductive layer 6 while such additional charge components, as present at select portions of the thermoplastic surface, will cause additional perturbations of such select surface portions in accordance with the charge levels associated therewith in the manner of the frost mechanism which ordinarily operates in a frostable surface due to the charge pattern present thereon.

The second possible explanation for the phenomenon which causes the frost deformations which take place at the surface of the thermoplastic layer 8 to follow the profile of a physical deformation present at the interface between the thermoplastic layer 8 and the photoconductive layer 6, so that the resulting frost deformation may be organized into a periodic mode, may be set forth in terms of hydrodynamic resonance. As is well known to those of ordinary skill in the art, in materials such as thermoplastic materials whose viscosity has been varied from a high to a relatively low state, the transition to a semi-liquidous state will be accompanied by the formation of convection cells which are related to the quasi resonant frequency of the material and will induce motion at the surface of the material to cause the same to deform. Therefore, if the material thickness is such that hydrodynamic resonance is controlling, the surface of the material will deform in a manner which is substantially dictated by the motion induced by the convection cells formed during the transition of such material. Thus, although the convection cells formed may be considered to be random in nature when one surface of the material is smooth and rigidly maintained in this condition by a fixed interface such as the flat interface normally present between the thermoplastic layer and the photoconductive layer in a conventional photoreceptor structure; such convection cells may be organized, due to their relationship with the quasi resonant frequency of the material, by the insertion of a periodic physical deformation which approximates the quasi resonant frequency $\omega_R$ of the material at the interface between the thermoplastic layer 8 and the photoconductive layer 6 in the photoreceptor structure according to the present invention. Accordingly, when these conditions obtain, the surface of the material, in this case the surface of the thermoplastic layer 8, will deform in a regular periodic manner, in the frost mode, wherein the periodicity of such deformation will approach the quasi resonant frequency $\omega_R$ of the thermoplastic layer 8. In addition, the surface of the thermoplastic layer 8, upon the development thereof will frost in the ordinary manner due to the charge pattern thereon so that frost deformations whose densities vary in accordance with the light and dark pattern 16 will also occur in conjunction with the periodic frost deformations which the surface of the thermoplastic layer 8 is forced to exhibit.

Accordingly, it will be appreciated that the development step shown in FIG. 1D of the exemplary organized thermoplastic xerography technique results in a frost deformation pattern wherein the overall frost image formed exhibits the periodicity of the physical profile of the deformation present at the interface between the thermoplastic layer 8 and the photoconductive layer 6 while forming a frost image of the light and dark pattern 16 through which the selective exposure step set forth in FIG. 1B was accomplished. Therefore as the resulting frost image formed on the surface of the thermoplastic layer 8 is forced to deform in a regular periodic manner, the problems associated with non-uniform frost initiation and the attendant image distortion caused by non-uniform growth rates is completely avoided whereby high resolution, continuous tone frost images may be achieved. Thus, it will be appreciated that the instant organized thermoplastic xerography techniques yield input exposure modulated periodic growth structure in the form of frost patterns on a thermoplastic surface without the necessity of deriving such input exposure from an optical modulating screen or grid of either an absorbing or lens-like nature. Once the frost image is thus formed in the foregoing manner, it may be directly viewed due to the well known radiation diffusing properties of such frost images, viewed indirectly by well known transmission or reflection techniques or projected through a conventional Schlieren system in the usual manner. The photoreceptor structure may then be stored indefinitely for future use or erased in the well known manner so that other frost images may be subsequently formed thereon.

Although rather specific organized thermoplastic xerography techniques have been disclosed in conjunction with FIGS. 1A–1D, it will be manifest that many modifications and variations may be substituted for the specific features thereof without deviating from the essential concepts involved. For instance, although in FIG. 1B the selective exposure of the photoconductive layer 6 was accomplished from the thermoplastic side of the photoreceptor structure, exposure could take place from the substrate side of the photoreceptor structure provided the substrate 2, the periodic structure 4 as well as any conductive material relied upon were formed of transparent, non-distorting materials. This mode of operation though clearly available is not preferred because the substrate 2, the periodic structure 4 and any conductive material relied upon would have to exhibit high optical quality to avoid the distortion of the input exposure or activating radiation applied therethrough. Also, the periodic structure 4 could not be formed of absorptive material as is conventionally used in screened frost systems. Thus, as expensive materials such as high grade glass or plastics would be required to obtain such high quality optical properties, it will be apparent that this alternative mode of operation would introduce unnecessary expense when viewed from a manufacturing standpoint.

As another alternative, if the substrate 2 is formed of metal or another reflective material, or the periodic structure 4, which may be transparent is formed on a metal film or plate, image or activating radiation which is not absorbed in its initial propagation through the photoreceptor structure will be reflected and redirected back through the photoreceptor structure. This alternative embodiment allows the thickness of the photoconductive layer 6 to be substantially reduced and acts to increase the broad area red light sensitivity of the device.

The organized thermoplastic xerography techniques described above exhibit a plurality of advantages over screened thermoplastic recording techniques, because in addition to avoiding problems associated with non-uniform frost initiation and providing continuous tone, high resolution frost images; all of the input or activating radiation applied thereto is received by the photoreceptor and the entire surface of the thermoplastic layer deforms in a periodic manner. The ability to apply all of the input or activating radiation to the photoconductive layer 6, which should be distinguished from screened frost techniques wherein such input or activating radiation is modulated by the selective absorption thereof by screen or grid means, is advantageous because as all of the incident input or activating radiation is available for input image related deformations, the signal-to-noise ratios of the frost image formed in terms of desired-to-undesired surface deformations can be higher than those obtained from screened thermoplastic recording or xerography techniques. Furthermore, the ability to utilize all of the input or activating radiation applied to the photoreceptor structure places less demand upon the resolution capabilities of the photoconductive layer 6 because said photoconductive layer 6 need only be capable of maintaining resolution at the highest frequency component of the image radiation while in the screened frost case, the photoconductive layer of the photoreceptor structure must preserve transverse resolution capabilities equal to the screen frequency plus the highest frequency component of the image radiation. Accordingly, the photoconductive layer 6 in a photoreceptor structure used in conjunction with the instant organized thermoplastic xerography techniques may typically exhibit resolution capabilities of the order one hundred (100) cycles per millimeter while those utilized in the screened frost mode of operation require a peak response which is typically in the order of five hundred (500) cycles per millimeter.

Similarly, the characteristics of the frost deformation patterns formed in accordance with the instant organized thermoplastic xerography techniques, wherein such frost deformation patterns are everywhere periodic, are highly advantageous when compared to the frost deformation patterns formed with screen frost techniques because frost patterns formed by optical screening of the image radiation are directly dependent upon exposure levels for obtaining carrier modulation in the form of periodic deformations while the periodicity of the frost patterns formed with the organized frost mechanism of the present invention is virtually independent of exposure levels and hence exhibits substantially less noise. This may be appreciated by considering a case wherein a portion of the photoreceptor structure receives no activating radiation due to a substantially opaque portion on the object to be reproduced in an embodiment wherein the activating radiation is selectively applied by making use of the light transmission qualities of such object in a similar manner to that shown in FIG. 1B. When these conditions obtain in a screened frost system, as no activating radiation is received at such portion of the photoreceptor structure, the corresponding surface portion of the thermoplastic layer of such photoreceptor structure will not receive a periodic charge pattern representative of the carrier frequency of the input or activating radiation applied thereto. Thus, when this unexposed surface portion of the surface of the thermoplastic layer subsequently frosts, the frost pattern formed in such unexposed surface portion will not exhibit the same periodicity as the remaining portion of such surface and hence when the frost surface of the thermoplastic layer is demodulated during readout the unmodulated, frosted portion of the surface of the thermoplastic layer will manifest itself as noise. Conversely, if the same conditions obtain during the practive of an organized thermoplastic xerography technique, it will be seen that the entire surface of the thermoplastic layer 8 will deform exhibiting the same periodicity regardless of whether or not certain portions thereof do not receive activating radiation because the periodic frost deformation of the surface of the thermoplastic layer 8 here derives from the periodic physical deformation present at the interface between the thermoplastic layer 8 and the photoconductive layer 6 and not the activating radiation received thereby. Therefore, as the frosted surface of the thermoplastic layer 8, formed in accordance with organized thermoplastic xerography techniques, is everywhere periodic and hence exhibits the same carrier frequency, no discrete portion thereof will manifest itself as noise when read out due to an absence of input or activating radiation. Thus it will be seen that the instant organized thermoplastic xerography techniques possess a plurality of marked advantages over the frost recording or xerography techniques currently practiced according to prior art teachings.

Figure 2:
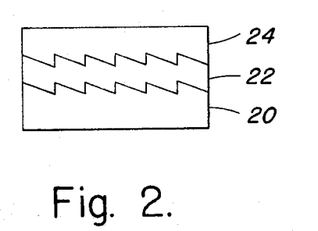
FIG. 2 shows an exemplary embodiment of the present invention wherein a photoreceptor structure is adapted to establish a charge profile calculated to optimize defracted radiation into a desired order when subjected to organized thermoplastic xerography techniques such as those illustrated in FIGS. 1A–1D.

FIG. 2 shows an exemplary embodiment of photoreceptor structure according to the teachings of the present invention wherein such photoreceptor structure is adapted to establish a charge profile calculated to optimize defracted radiation into a desired order and thereby exhibit a blazed effect when subjected to organized thermoplastic xerography techniques such as those illustrated in FIGS. 1A–1D. The photoreceptor structure according to the present invention, as shown in FIG. 2, comprises a substrate 20, a photoconductive layer 22 and a thermoplastic layer 24 overcoated on said photoconductive layer 22. The substrate 20 may take the form of supporting medium described above, anent substrate 2, which is capable of supporting the remaining portions of the photoreceptor structure in a relatively rigid form regardless of whether or not the thermoplastic layer 24 is in a high or low viscosity state. The substrate 20 may exhibit either dielectric or conductive electrical characteristics depending upon the choice of the materials used; however, should a dielectric material be selected, it is again desirable to place a thin conductive film (not shown herein) in electrical contact with the photoconductive layer 22 at the interface formed with the substrate 20. As was the case for the substrate 2, described above, the substrate 20 should be characterized by physical properties such that it maintains the same relative rigidity when the thermoplastic layer 24 is heated, treated by solvents or solvent vapors while being sufficiently flexible at all time so as to enable the photoreceptor structure formed to be used, if desired, in the form of webs or tapes which admit of winding and reeling techniques. As shown in FIG. 2, the upper surface of the substrate 20 has been deformed in the periodic manner so that the profile thereof has the appearance of a triangular or sawtooth waveform having a desired frequency $\omega_r$ which preferably approaches the quasi resonant frequency $\omega_R$ of the thermoplastic layer 28. The amplitude of the surface excursions of the regularly deformed surface of the substrate 20 should be sufficient so that the periodic profile thereof will replicate through the photoconductive layer 22 to thereby cause the periodic physical deformation pattern associated therewith to manifest itself at the interface between the photoconductive layer 22 and the thermoplastic layer 24 in the same manner described in conjunction with the photoreceptor structure set forth in FIGS. 1A–1D. The surface of the substrate 20 should be deformed in a manner such that each recurring deformation exhibits a substantially vertical rise displacement and a decay displacement having a constant angular slope in the negative direction. The constant angular slope of the decay displacement should be such that radiation which impinges thereon, or more particularly on the perturbations of the surface of the thermoplastic layer 24 deformed, as will be seen below, in a corresponding manner thereto, is refracted in a preferred direction whereby the periodically deformed surface of the thermoplastic layer 24, upon the development thereof will take on the characteristics of a blazed grating. Although the preferred refraction direction selected by the choice of the constant angular slope relied upon for the decay displacement of each deformation present on the formed surface of the substrate 20 could be chosen to be convenient to any desired direction of refraction, it is desirable that the regularly deformed surface of the substrate be related to the quasi resonant frequency $\omega_R$ of the thermoplastic layer 24. Therefore, to achieve an appropriate relationship between the regularly deformed surface of the substrate 20 and the quasi resonant frequency $\omega_R$ of the thermoplastic layer 24, it is preferred that the fundamental and the first few harmonics of the regularly deformed surface of the substrate 20 be related to the quasi resonant frequency $\omega_R$ of the thermoplastic layer 24 and hence the constant angular slope of the decay displacement of the sawtooth waveform associated with the profile of the regularly deformed surface of the substrate 20 limited to a range within that available from said fundamental and first few harmonics.

In the photoreceptor structure illustrated in FIG. 2, the periodic structure corresponding to the periodic structure 4 in FIGS. 1A–1D has been shown as formed directly on the surface of the substrate 20. Accordingly, such corresponding periodic structure would ordinarily be formed of the same material as that selected for the substrate 20; although, when such substrate 20 is transparent, the corresponding periodic structure could comprise a photoresist layer or lenticular layer formed thereon. In either event, the regularly deformed surface of the substrate 20 may be formed by conventional etching or mechanical deposition techniques commonly employed in the production of gratings. Although the substrate 20 has been illustrated in FIG. 2 as having a surface thereof periodically deformed in a manner such that it will replicate through the photoconductive layer 22 to manifest itself at the interface between the photoconductive layer 22 and the thermoplastic layer 24, it will be apparent that an alternative mode of construction would include the formation of the substrate 20 with a relatively smooth upper surface and the provision of a separate periodic structure between the substrate 20 and the photoconductive layer 22 which exhibits the same profile on at least the upper surface thereof as the surface of the substrate 20 depicted in FIG. 2. Furthermore, as the sole purpose of the regularly deformed surface of the substrate 20 is to establish, as aforesaid, a periodically varying physical profile at the interface between the photoconductive layer 22 and the thermoplastic layer 24 to induce a periodic frost deformation pattern when the photoreceptor structure is developed; it will be manifest that such periodically varying physical profile could be directly established at the interface between the photoconductive layer 22 and the thermoplastic layer 24 by the insertion of a radiation transmissive, periodically varying structure thereat rather than by the replication technique illustrated in FIG. 2.

The photoconductive layer 22 may comprise any of the well known class of materials described above with reference to the photoconductive layer 6 which exhibit electrical characteristics such that they are insulating in nature but may be rendered conductive upon the application of radiation thereto. In FIG. 2, the photoconductive layer 22 has been illustrated as having the periodically deformed surface of the substrate 20 replicated therethrough so that a periodic physical deformation obtains at the upper surface of the photoconductive layer 22 and hence resides at the interface between the photoconductive layer 22 and the thermoplastic layer 24. Therefore, it will be appreciated that the photoconductive layer 22 may have any thickness which is suitable for the formation and selective dissipation of charge patterns having the requisite magnitude so that frost deformation patterns having high resolution may be formed while allowing the regularly deformed surface of the substrate 20 to replicate therethrough. Furthermore, it will be understood that if the substrate 20 is made reflective, the thickness of the photoconductive layer 22 may be reduced.

The thermoplastic layer 24 shown in FIG. 2 may comprise any of the class of thermoplastic materials described above in conjunction with the thermoplastic layer 8 and may be overcoated on the photoconductive layer 22 by any of the conventional techniques heretofore set forth. In addition, the thermoplastic layer 24 may be considered to have the same structural relationship in the photoreceptor structure illustrated in FIG. 2 and have the same configuration as did the thermoplastic layer 8, described above, except that the periodic physical deformation present at the interface thereof with the photoconductive layer 22 has a regularly deformed profile resembling a sawtooth waveform rather than a sinusoidal waveform. In FIG. 2, the photoreceptor structure has been illustrated in an uncharged, unexposed and undeveloped state and therefore, the upper surface of the thermoplastic layer 24 has been shown in the relatively smooth condition generally dictated by the surface tension of the layer.

The photoreceptor structure according to the present invention, as shown in FIG. 2, may be utilized in any organized thermoplastic xerography process, such as that described above in reference to FIGS. 1A–1D, so that continuous tone, high resolution frost deformation patterns having a regular periodic structure may be formed on the surface of the thermoplastic layer 24 and distortion problems associated with non-uniform frost initiation will be avoided because the thermoplastic layer 24 is predisposed and hence forced to deform in a regular periodic manner upon the development thereof. However, as will be appreciated by those of ordinary skill in the art from the description of the organized thermoplastic xerography techniques set forth above in conjunction with FIGS. 1A-1D, the surface of the thermoplastic layer 24 will here deform in a regular manner which is exposure related and dictated by the sawtooth profile of physical deformation present at its interface with the photoconductive layer 22. Thus, as the regular periodic physical deformation present at the interface between the thermoplastic layer 24 and the photoconductive layer 22 is calculated to refract a major portion of the radiation impingement thereon in a desired direction, the surface of the thermoplastic layer 24 will be forced to deform, upon the development thereof, in the regular periodic manner of a sawtooth waveform whose amplitude is exposure related but whose overall periodicity exhibits a substantially vertical rise displacement and a decay displacement adapted to refract a major portion of the radiation impingent thereon into a first diffracted order. Accordingly, it will be seen that the photoreceptor structure of the present invention illustrated in FIG. 2 takes on the characteristics of a blazed grating, upon the development thereof, and therefore exhibits a preferred readout direction which is a function of its periodicity and enables a vast increase in the efficiency of the photoreceptor structure in converting readout or projection radiation into the intensity of the output image. These characteristics of the photoreceptor structure, shown in FIG. 2, render this embodiment of the present invention particularly useful in applications where the intensity of the readout beam power level is limited or the readout operation is carried out as a scanning operation and is required to be quickly accomplished.

Figure 3:
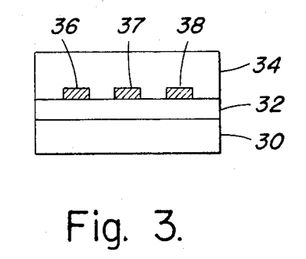
FIG. 3 illustrates another embodiment of the present invention.

FIG. 3 shows another embodiment of the present invention wherein photoreceptor structure is illustrated having a regular, periodic physical deformation present at the interface between the thermoplastic and photoconductive layers therein which regular periodic physical deformation is directly established at such interface rather than being replicated through the photoconductive layer as was the case in the preceding embodiment of the present invention. The photoreceptor structure, according to the present invention, as shown in FIG. 3, comprises a substrate 30, a photoconductive layer 32 and a thermoplastic layer 34 overcoated on such photoconductive layer 32. The substrate 30 and the photoconductive layer 32 may comprise the same materials, take the same form, and exhibit the same properties as the substrate 2 and the photoconductive layer 6 previously described in conjunction with FIGS. 1A–1D and hence these characteristics will not be reiterated so that undue repetition is avoided. The upper surface of the photoconductive layer 32, as shown in FIG. 3, is regularly deformed in a periodic manner so that the periodic physical deformation formed at the interface between the photoconducitve layer 32 and the thermoplastic layer 34, is directly established. The periodicity of the regularly deformed surface of the photoconductive layer 32 is preferably related to the quasi resonant frequency $\omega_R$ of the thermoplastic layer 34 as in the preceding embodiments of the present invention so that the thermoplastic layer 34 is again predisposed to deform in a periodic manner, upon the development thereof, wherein perturbations of the surface of the thermoplastic layer 34, resulting in a frost deformation pattern, will be exposure related but forced to occur at a frequency which approaches the quasi resonant frequency $\omega_R$ of the thermoplastic layer 34. The periodic deformation of the surface of the photoconductive layer 32 may be accomplished in any conventional manner which is convenient to the formation of the photoreceptor structure. For instance, the surface of the photoconductive layer 32 may be etched by conventional etching techniques, well known to those of ordinary skill in the art, so that the desired physical deformations are formed on the surface of the photoconductive layer 32 and are therefore present at the interface with the thermoplastic layer 34. Alternatively, as shown in FIG. 3, the surface of the photoconductive layer 32 may be coated with photoresist, exposed to a bar pattern, developed and thereafter the photoconductive surface may be etched to form the periodic structure 36–38 at the interface between the photoconductive layer 32 and the thermoplastic layer 34. Additionally, as will be obvious from the precedng portions of this disclosure, mechanical or other deposition techniques may be utilized to produce radiation transmissive rod or bar-like elements at the surface of the photoconductive layer 32 to thereby provide the requisite periodic physical deformation pattern at the interface between the photoconductive layer 32 and the thermoplastic layer 34.

Upon the formation of the periodic physical deformations on the surface of the photoconductive layer 32, the thermoplastic layer 34 may be overcoated on the deformed surface of the photoconductive layer 32 by any of the conventional coating techniques mentioned above. The thermoplastic layer 34 may take the precise form and exhibit the same characteristics as the thermoplastic layers 8 and 24 described above in conjunction with FIGS. 1A–1D and 2. In FIG. 3, the upper surface of the thermoplastic layer 34 has been shown in an unchanged, unexposed and undeveloped state; however, it will be understood from the descriptive matter set forth above that when the photoreceptor structure illustrated in FIG. 3 is utilized in an organized thermoplastic xerography process such as that described in conjunction with FIGS. 1A–1D, the surface of the thermoplastic layer 34 will frost in an organized periodic manner to thereby form a high resolution, continuous frost image, free of distortion problems associated with non-uniform frost initiation.

Although the present invention has been disclosed in conjunction with several specific embodiments, it will be manifest to those of ordinary skill in the art that many modifications and variations of such specific embodiments may be made without departing from the inventive concepts set forth herein. Therefore it shall be clearly understood that his invention is not limited to any of the embodiments or materials set forth herein as they merely constitute preferred modes of practicing the present invention.

What is claimed is:

1. In photoreceptor structure including at least a photoconductive layer and a thermoplastic layer having an interface therebetween, the improvement comprising:
means for establishing a regular periodic deformation pattern having a profile which includes a recurring geometric configuration of at least two substantially linear sides at said interface between said photoconductive layer and said thermoplastic layer.

2. The improved photoreceptor structure according to claim 1 wherein said regular periodic deformation pattern is characterized by a profile corresponding to a sawtooth waveform.

3. The improved photoreceptor structure according to claim 1 wherein said regular periodic deformation pattern exhibits a profile corresponding to a rectangular waveform.

4. The improved photoreceptor structure according to claim 1 wherein said means for establishing said regular periodic deformation pattern at said interface includes means physically present at said interface for establishing a periodic deformation therein.

5. The improved photoreceptor structure according to claim 4 wherein said thermoplastic layer exhibits an ascertainable quasi resonant frequency and said periodic deformation manifests a periodicity substantially equal to said quasi resonant frequency.

6. The improved photoreceptor structure according to claim 5 wherein said regular periodic deformation pattern exhibits a profile corresponding to a rectangular waveform.

7. The improved photoreceptor structure according to claim 1 wherein said means for establishing said regular periodic deformation pattern at said interface includes a periodic structure having said regular periodic deformation pattern associated with a surface thereof, said photoconductive layer being positioned on said surface of said periodic structure in said photoreceptor structure in a manner such that said regular periodic deformation pattern associated with said surface thereof replicates through said photoconductive layer to said interface whereby said regular periodic deformation pattern is established at said interface.

8. The improved photoreceptor structure according to claim 7 wherein said thermoplastic layer exhibits an ascertainable quasi resonant frequency and said periodic deformation manifests a periodicity substantially equal to said quasi resonant frequency.

9. The improved photoreceptor structure according to claim 7 wherein said photoreceptor structure includes substrate means for receiving said photoconductive and thermoplastic layers thereon and maintaining said photoreceptor structure in a relatively rigid condition, said photoreceptor structure comprising at least a three layer structure having said photoconductive layer disposed intermediate said substrate means and said thermoplastic layer and being predisposed upon the development thereof to have a surface of said thermoplastic layer deform in a frost mode in a manner dictated by said regular periodic deformation pattern so that the resulting frost deformation pattern is everywhere periodic.

10. The improved photoreceptor structure according to claim 9 wherein said periodic structure is an independent structure interposed in said photoreceptor structure intermediate said substrate means and said photoconductive layer.

11. The improved photoreceptor structure according to claim 10 wherein said thermoplastic layer exhibits an ascertainable quasi resonent frequency and said periodic deformation manifests a periodicity substantially equal to said quasi resonant frequency.

12. The improved photoreceptor structure according to claim 9 wherein said periodic structure is formed on a surface of said substrate means in physical communication with said photoconductive layer.

13. The improved photoreceptor structure according to claim 12 wherein said thermoplastic layer exhibits an ascertainable quasi resonant frequency and said periodic deformation manifests a periodicity substantially equal to said quasi resonant frequency.

14. The improved photoreceptor structure according to claim 13 wherein said regular periodic deformation pattern will predispose said surface of said thermoplastic layer to deform in a frost mode whose periodic nature takes on the characteristics of a blazed grating.

15. A method of forming improved photoreceptor structure for use in conjunction with organized thermoplastic xerography techniques comprising the steps of:
applying a layer of photoconductive material to a surface of substrate means;
forming a layer of thermoplastic material upon said layer of photoconductive material so that an interface is formed therebetween; and
predisposing an exposed surface of said layer of thermoplastic material to deform in a regular periodic manner so that said surface will be everywhere periodic upon the development thereof by establishing a regular periodic deformation pattern having a profile including a recurring geometric configuration of at least two substantially linear sides at said interface between said layer of thermoplastic material and said layer of photoconductive material.

16. The method of forming the improved photoreceptor structure according to claim 15 wherein said regular periodic deformation pattern established at said interface is formed in a manner so as to exhibit a profile which corresponds to a sawtooth waveform.

17. The method of forming the improved photoreceptor structure according to claim 15 wherein said regular periodic deformation pattern established at said interface is established in a manner so as to exhibit a profile corresponding to a rectangular waveform.

18. The method of forming the improved photoreceptor structure according to claim 15 wherein said regular periodic deformation pattern is established at said interface by the step of physically deforming one of the layers present at said interface by interposing, in a periodic manner structural means thereat.

19. The method of forming the improved photoreceptor structure according to claim 18 wherein said layer of thermoplastic material is overcoated upon the surface of said layer of photoconductive material in a manner to exhibit a predetermined quasi resonant frequency and said regular periodic deformation pattern is established in a manner to exhibit periodicity substantially equal to said quasi resonant frequency.

20. The method of forming the improved photoreceptor structure according to claim 15 wherein said regular periodic deformation pattern is established at said interface by the steps of interposing a periodically deformed structure intermediate said substrate and the layer of photoconductive material applied thereto and applying said layer of photoconductive material in a manner such that the deformation pattern associated with said periodically deformed structure replicates therethrough.

21. The method of forming improved photoreceptor structure according to claim 15 wherein said regular periodic deformation pattern is established at said interface by the steps of periodically deforming said surface of said substrate means upon which the photoconductive layer is applied and applying said layer of photoconductive material in a manner such that the deformation pattern associated with said periodically deformed surface replicates therethrough.

22. The method of forming the improved photoreceptor structure according to claim 21 wherein said regular periodic deformation pattern established at said interface is formed in a manner so as to exhibit a profile which corresponds to a sawtooth waveform.

23. The method of forming the improved photoreceptor structure according to claim 22 wherein said layer of thermoplastic material is overcoated upon the surface of said layer of photoconductive material in a manner to exhibit a predetermined quasi resonant frequency and said regular periodic deformation pattern is established in a manner to exhibit a periodicity substantially equal to said quasi resonant frequency.

24. A photoreceptor structure comprising a thermoplastic layer overlying a photoconductive layer to form a common boundary therebetween, said common boundary being deformed in a regular periodic deformation pattern to exhibit a profile of a recurring geometric configuration of at least two substantially linear sides.

25. The photoreceptor structure according to claim 24 wherein said thermoplastic layer exhibits an ascertainable quasi resonant frequency and said periodic deformation manifests a periodicity substantially equal to said quasi resonant frequency.

26. The photoreceptor structure according to claim 25 wherein said common boundary is deformed by means present at said common boundary for deforming said boundary in a regular periodic manner.

27. The photoreceptor structure according to claim 25 wherein said common boundary is deformed by a periodic structure having said regular periodic deformation pattern associated with a surface thereof, said photoconductive layer being positioned on said surface of said periodic structure in a manner such that said regular periodic deformation pattern associated with said surface replicates through said photoconductive layer to said common boundary.

References Cited
UNITED STATES PATENTS

| | | | |
|---|---|---|---|
| 3,560,206 | 2/1971 | Juirblis | 96—1.1 |
| 3,400,382 | 9/1968 | Kurzweil | 340—173 TP |
| 3,413,146 | 11/1968 | Anderson et al. | 96—1.1 X |
| 3,542,545 | 11/1970 | Goffe | 96—1.1 |
| 3,170,790 | 2/1965 | Clark | 96—1.5 |
| 3,406,405 | 10/1968 | Somers | 178—6.6 TP |
| 3,436,216 | 4/1969 | Urbach | 96—1.1 |

CHARLES E. VAN HORN, Primary Examiner

U.S. Cl. X.R.

117—218; 355—9; 340—173 TP; 178—6.6 TP